United States Patent [19] Paranjpe

[11] 4,085,409

[45] Apr. 18, 1978

[54] METHOD AND APPARATUS FOR INK JET PRINTING

[75] Inventor: Suresh C. Paranjpe, Xenia, Ohio

[73] Assignee: The Mead Corporation, Dayton, Ohio

[21] Appl. No.: 691,854

[22] Filed: Jun. 1, 1976

[51] Int. Cl.$^2$ .............................................. G01D 15/18

[52] U.S. Cl. ...................................................... 346/75

[58] Field of Search ...................................... 346/75, 1

[56] References Cited

U.S. PATENT DOCUMENTS 3,298,030 1/1967 Lewis .................................... 346/75

3,701,998 10/1972 Mathis .................................. 346/75

3,813,676 5/1974 Wolfe .................................... 346/75

4,010,477 3/1977 Frey ...................................... 346/75

*Primary Examiner*—Joseph W. Hartary

*Attorney, Agent, or Firm*—Biebel, French & Nauman

[57] ABSTRACT

An ink jet printer prints on a moving web with two parallel rows of drop streams which are oblique to the direction of web movement. A deflection ribbon extends between the rows of drop streams and opposed catchers are disposed outwardly of the rows of drop streams. The drops in the drop streams are selectively charged to one of a plurality of charge levels. A drop deflecting field is generated by applying a potential to the deflection ribbon which is of like polarity to the charge on the drops. Individual drops are therefore deflected toward the catchers perpendicularly to the rows of drop streams. Drops in the drop streams may strike the web at one of a plurality of print positions or, if sufficiently charged, may be deflected to strike a catcher.

12 Claims, 8 Drawing Figures

METHOD AND APPARATUS FOR INK JET PRINTING

BACKGROUND OF THE INVENTION

This invention relates generally to the field of fluid drop generation and the application thereof to jet drop recorders of the type shown in U.S. Pat. No. 3,701,998 to Mathis, issued Oct. 31, 1972. In recorders of this type, a pair of rows of orifices receive an electrically conductive recording fluid, such as for instance a water base ink, from a pressurized fluid manifold and eject the fluid in two rows of parallel streams. The fluid flows through orifices in a plate with the formation of drops being stimulated by the application of a series of traversing waves to the plate. This method of drop generation is more completely described in U.S. Pat. No. 3,739,393 to Lyon et al., issued June 12, 1973.

Graphic reproduction in recorders of this type is accomplished by selectively charging and deflecting some of the drops in each of the streams and thereafter depositing the uncharged drops on a moving web of paper or other material. The direction of web movement is substantially perpendicular to the rows of orifices. Charging of the drops is accomplished by application of charge control signals to charging electrodes near the edge of the streams. As the drops separate from their parent fluid filaments, they carry a portion of the charge applied by the charging electrodes. Thereafter, the drops pass through electrostatic fields which have no effect upon the uncharged drops but which cause the charged drops to be deflected. Drops which are not to be printed are charged sufficiently to be deflected to one or the other of a pair of catchers which service the rows of streams.

U.S. Pat. No. 3,787,883 to Cassill, issued Jan. 22, 1974, discloses apparatus for creating the deflecting electrostatic fields. A thin deflection ribbon is positioned between and parallel to the two rows of parallel drop streams with the catchers positioned outwardly of the drop streams. A voltage is applied between the deflection ribbon and the catchers such that charged ink drops will be deflected to one of the two catchers.

One problem with printers of this type and with all types of ink jet printers has been attaining sufficient image resolution. Since a discrete number of drops are applied to form the images, it is clear that image definition may be improved by increasing the number of drops and providing a proportionate increase in data handling capability. If, however, only one print position per print line is serviced by each orifice, the number of drops per unit width and therefore the resolution of an image in the direction transverse to the web is limited by the minimum dimensions required for each orifice. The approach taken in the Mathis device is to provide two rows of drop streams which are staggered. The charging of drops in the two rows is timed such that printing from the two rows of streams is in registration. The distance between adjacent streams in each of the rows is therefore twice the distance which would separate streams in a printer of comparable resolution having one row of streams.

Another approach to this problem is shown in U.S. Pat. No. 3,373,437, issued to Sweet et al. on Mar. 12, 1968, and assigned to the assignee of the present invention. FIG. 6 of the reference shows a configuration in which the jets in a single row are formed in a converging array, thus permitting greater spacing between the individual orifices and their accompanying charging electrodes. Such a configuration is, however, disadvantageous in that the distance traveled by the drops in each stream will be slightly different, and as a result, data timing will be very complicated. Additionally, it is somewhat difficult to insure that the streams continue to converge as they approach the web.

In U.S. Pat. No. Re. 28,219, issued Oct. 29, 1974 to Taylor et al., and assigned to the assignee of the present invention, a printer has a plurality of separate orifice arrays positioned in tandom, with each successive array being laterally offset. The orifices are positioned such that they interlace to provide print capability across the entire web. The orifice arrays, like the two rows of orifices in the Mathis printer, extend perpendicular to the direction of web movement. The Taylor et al printer, like those of Sweet et al and Mathis, is binary, i.e. a drop formed at an orifice is either printed at one predetermined position on the moving web, or it is deflected to a catcher and not printed at that predetermined position.

Another approach is shown in U.S. Pat. No. 3,739,395 to King, issued June 12, 1973 and assigned to the assignee of the present invention. In the King device, uncharged drops are caught and thus do not print while charged drops from each orifice are deflected by two sets of deflection electrodes to a plurality of discrete print positions on the moving web. Deflection of the drops is either perpendicular or parallel to the direction of web movement, or both, covering either a one line matrix or a multiple line matrix on the web. Since a number of print positions on the web are serviced by a single jet, the distance between orifices may be greater than if each orifice serviced only one print position. The minimum distance between orifices is somewhat greater with the King device, however, since deflection electrodes must be positioned on all sides of each orifice.

U.S. Pat. No. 3,871,004, issued Mar. 11, 1975 to Rittberg, discloses a writing head which moves transversely with respect to a print web. Individual deflection electrodes are arranged adjacent each orifice on the print head such that drops may be deflected obliquely to the direction of head movement to one of three print positions. The orifices are positioned in a row perpendicular to the direction of head movement. The Rittberg device requires separate deflection electrodes for each individual jet. Additionally the electrode configuration is somewhat bulky, thus further limiting the minimum inter-orifice spacing.

The concept of increasing image resolution by increasing the number of print positions serviced by a single ink jet is also shown in U.S. Pat. No. 3,813,676, issued May 28, 1974 to Wolfe; U.S. Pat. No. 3,769,631, issued Oct. 30, 1973 to Hill et al.; and U.S. Pat. No. 3,298,030, issued Jan. 10, 1967 to Lewis et al. These patents show printing arrangements in which a single jet prints an entire line of characters as the print web is moved past the jet. The Wolfe reference shows deflection of the jet oblique to the direction of web motion to increase symbol printing flexibility.

Thus while various approaches have been taken to increase the image resolution of jet printers, a need exists for a simple printer capable of high speed printing of a large number of ink drops thus providing increased image definition.

SUMMARY OF THE INVENTION

In accordance with the present invention, there is provided a method and an ink jet printer for printing on a moving web. A means is provided for generating one or more rows of drop streams. A means for selectively charging drops in the drop streams includes a means for selectively charging each drop to one of at least two charge levels. Further provided is a means for positioning the rows of drops such that the rows are oblique to the direction of web movement.

A two row configuration has a pair of opposed catchers disposed outwardly of the rows of drop streams and parallel thereto. The catchers are grounded and function as electrodes in conjunction with a deflection ribbon which extends between the rows of drop streams. The deflection ribbon is parallel to the rows of drop streams and has applied to it a deflection voltage of the same polarity as the charge selectively applied to the drops such that the deflection of the drops is perpendicular to the rows of drop streams. At least two print positions for each drop are thereby defined on the moving web. One of the print positions may be defined by the trajectory of an uncharged drop. A drop carrying sufficient charge will be deflected so as to strike one of said catchers and therefore not print on the web.

Accordingly, it is an object of the present invention to provide a method and an ink jet printer in which the resolution of the printed image is enhanced; to provide such a method and printer in which at least one row of drop streams is oblique to the direction of web movement and in which the drop streams are deflected perpendicularly to the rows; and further to provide such a method and printer in which the trajectories of uncharged and charged drops define more than one print position for each orifice.

Other objects and advantages of the invention will be apparent from the following description, the accompanying drawings, and the appended claims.

DESCRIPTION OF THE PREFERRED EMBODIMENTS

Figure 1:
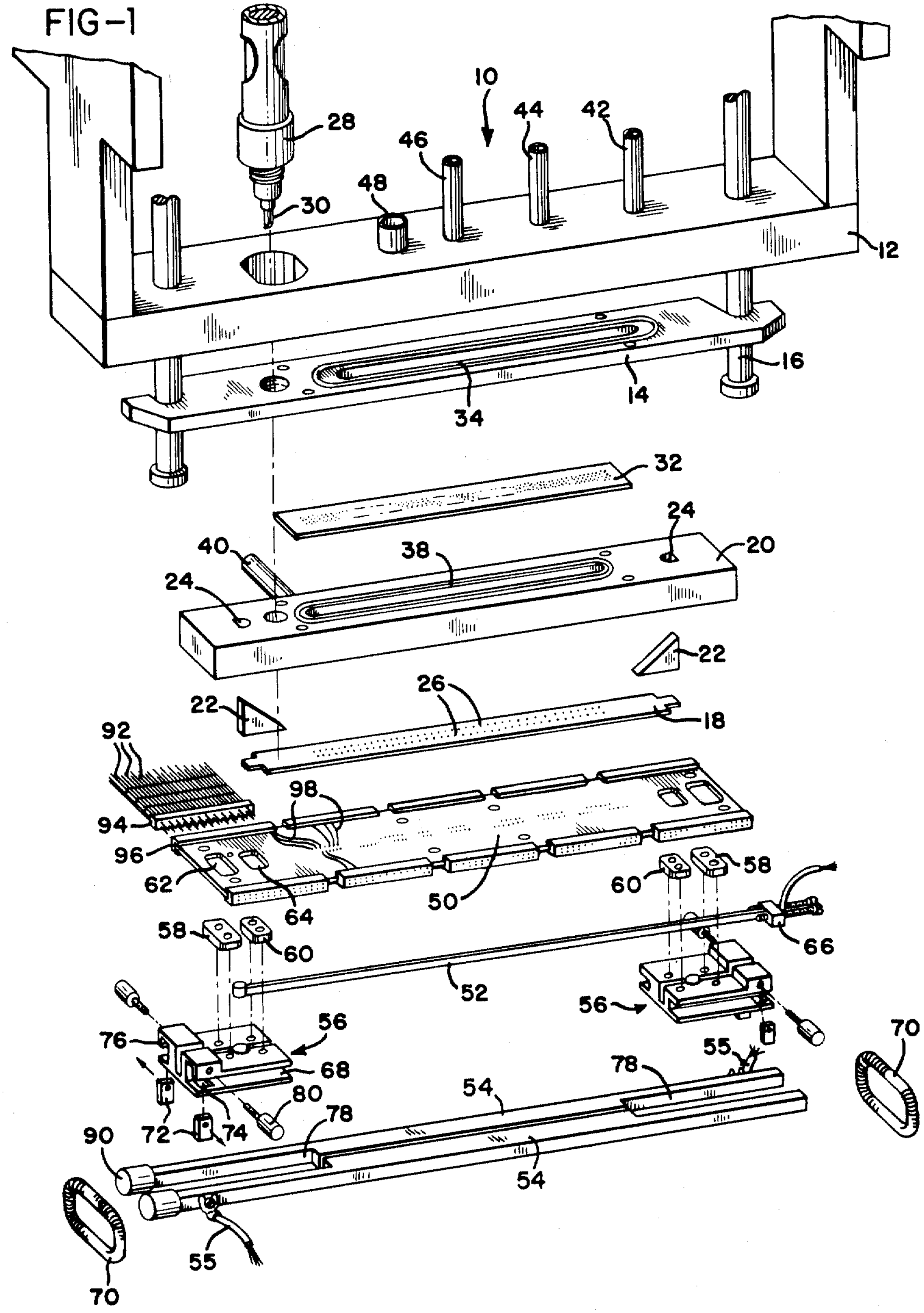
FIG. 1 is an exploded perspective view of a recording head assembly.

With reference to FIG. 1 of the drawings, it will be seen that the various elements of a head assembly 10 are assembled for support by a support bar 12. Assembly thereto is accomplished by attaching the elements by means of machine screws (not shown) to a clamp bar 14 which is in turn connected to the support bar 12 by means of clamp rods 16.

A means for generating two parallel rows of drop streams comprises an orifice plate 18 soldered, welded or otherwise bonded to fluid supply manifold 20 with a pair of wedge-shaped acoustical dampers 22 therebetween. Orifice plate 18 is preferably formed of a relatively stiff material such as stainless steel or nickel coated beryllium-copper but is relatively thin to provide the required flexibility for direct contact stimulation.

Orifice plate 18 contains two parallel rows of orifices 26 for forming the two parallel rows of drop streams. The head assembly is positioned such that these rows will be oblique to the direction of movement of the web beneath the head. The orifice plate 18 is preferably stimulated by a stimulator 28 which is threaded into clamp bar 14 to carry a stimulation probe 30 through the manifold 20 and into direct contact with plate 18. Orifice plate 18, manifold 20, clamp bar 14 together with a filter plate 32 and O rings 34, 35, and 38 (see FIG. 3) comprise a clean package which may be preassembled and kept closed to prevent dirt or foreign material from reaching and clogging orifices 26. Conduit 40 may be provided for flushing of the clean package. Service connections for the recording head include a fluid supply tube 42, air exhaust and inlet tubes 44 and 46, and a tube 48 for connection to a pressure transducer (not shown).

Means for selective charging of the drops comprises a charge ring plate 50. A deflection ribbon 52 is positioned to extend between the two rows of drop streams in parallel relation thereto. A pair of opposed catchers 54 are disposed outwardly of the rows of drop streams and are supported by holders 56 which are fastened directly to fluid supply manifold 20. Wires 55 comprise a means for grounding the catchers 54 and causing them to function as deflection electrodes.

Spacers 58 and 60 reach through apertures 62 and 64, respectively in charge ring plate 50 to support holders 56 without stressing or constraining charge ring plate 50. Deflection ribbon 52 is also supported by holders 56 and is stretched tightly therebetween by means of tightening block 66. Ribbon 52 extends longitudinally between catchers 54.

Catchers 54 are laterally adjustable relative to ribbon 52. This adjustability is accomplished by assembling the head with catchers 54 resting in slots 68 of holders 56, and urging them mutually inward with a pair of elastic bands 70. Adjusting blocks 72 are inserted upwardly through recesses 74 and 76 to bear against faces 78 of catchers 54, and adjusting screws 80 are provided to drive adjusting blocks 72 and catchers 54 outwardly against elastic bands 70. Holders 56 are made of insulative material which may be any available reinforced plastic board.

Figure 2:
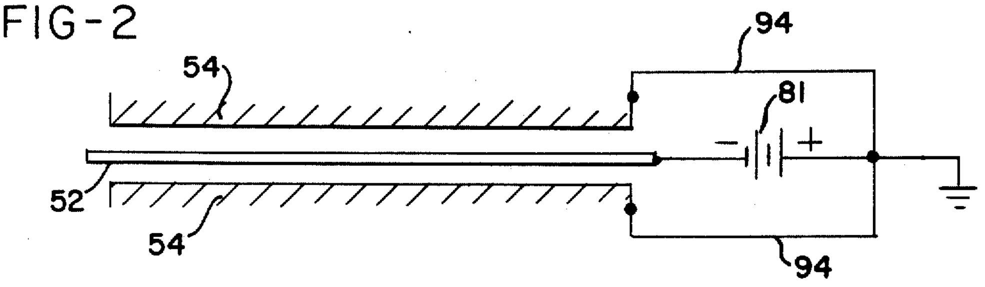
FIG. 2 is a diagrammatic representation of the electrical connections for the deflection ribbon and catchers.

As shown schematically in FIG. 2, means for applying a drop deflecting voltage to deflection ribbon 52 may comprise a battery 81 or any other source of electrical potential. A pair of equal strength, oppositely directed electrical deflection fields are induced between ribbon 52 and catchers 54. If a voltage of like polarity to the charge applied to the charged drops is applied to the ribbon, the charged drops will be deflected outwardly from the ribbon toward the catchers 54. The amount of deflection will be dependent, among other things, on the strength of the field and the amount of charge carried by a drop.

Figure 3:
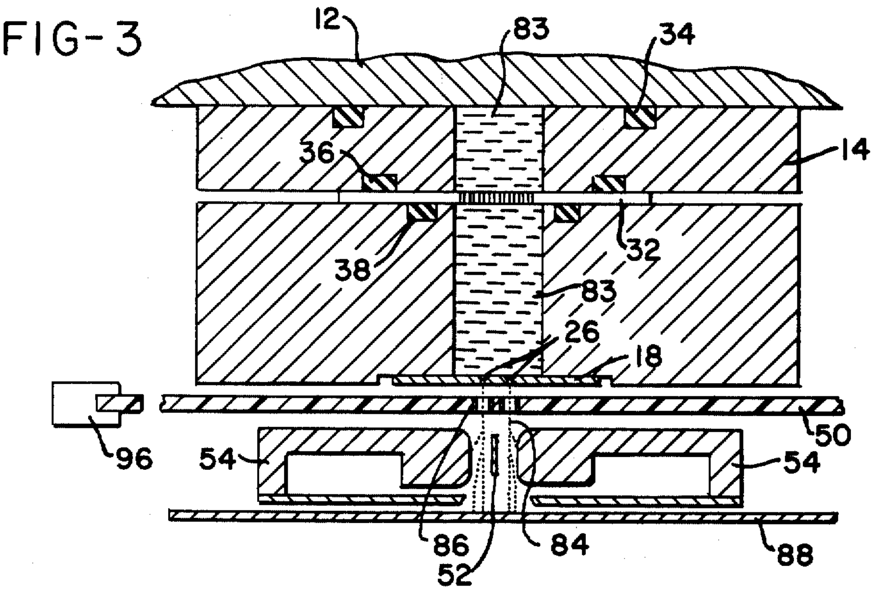
FIG. 3 is a sectional view through the assembly of FIG. 1, taken along a line passing through orifices on both sides of the deflection ribbon.
Figure 4:
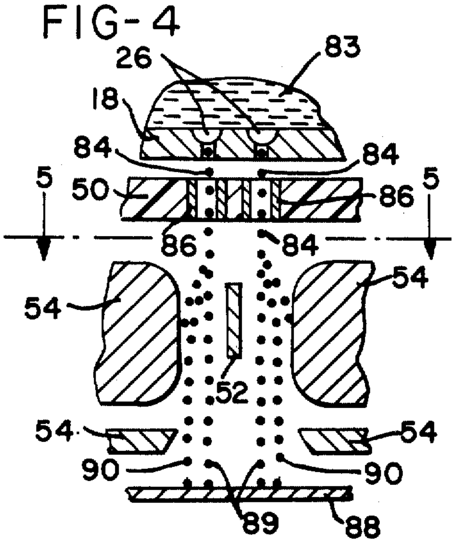
FIG. 4 is an enlarged view of a portion of FIG. 3.

FIG. 3 is a sectional view through the assembly of FIG. 1 along a line passing through orifices 26 on both sides of deflection ribbon 52. An enlarged portion of FIG. 3 is shown in FIG. 4. As shown in these views, ink fluid 83 flows downwardly through orifices 26 forming two rows of streams which break up into curtains of drops 84. Drops 84 then pass through two rows of charge rings 86 in charge ring plate 50 and thence onto one of the catchers 54, or onto the moving web of paper 88 at one of two print positions. Switching of drops between the "catch" trajectory and the two "print" trajectories is accomplished by electrostatic charging and deflection. Drops which are uncharged will pass undeflected through the fields between catchers 54 and ribbon 52 as shown by streams 89. Those drops carrying a slight charge will be deflected ouwardly from deflection ribbon 52 as shown by streams 90. Finally, those drops carrying a greater charge will be deflected sufficiently to strike catchers 54 with the result that they will not print on the moving paper web 88.

Formation of drops 84 is closely controlled by application of a constant frequency, controlled amplitude, stimulating disturbance to each of the fluid streams emanating from orifice plate 18. Disturbances for this purpose may be set up by operating transducer 28 to vibrate probe 30 at constant amplitude and frequency against plate 18. This causes a continuing series of bending waves to travel the length of plate 18; each wave producing a drop stimulating disturbance each time it passes one of the orifices 26. Dampers 22 prevent reflection and repropagation of these waves. Accordingly each stream comprises an unbroken fluid filament and a series of uniformly sized and regularly spaced drops all in accordance with the well known Rayleigh jet breakup phenomenon.

As each drop 84 is formed it is exposed to the charging influence of one of the charge rings 86. If the drop is to be deflected and caught, a substantial electrical charge is applied to the associated charge ring 86 during the instant of drop formation. This causes a corresponding electrical charge to be induced in the tip of the fluid filament and carried away by the drop. As the drop traverses the deflecting field set up between ribbon 52 and the face of the adjacent catcher, it is deflected to strike and run down the face of the catcher, where it is ingested, and carried off. Drop ingestion may be promoted by application of a suitable vacuum to the ends of catchers 54. When drops which are to be deposited on the web 88 are formed, either no electrical charge or a lesser charge is applied to the associated charge rings. The drops will then traverse the electric field in one of the two print trajectories shown in FIG. 4.

Appropriate charges are applied to desired drops by setting up an electrical potential difference between orifice plate 18 (or any other conductive structure in electrical contact with the ink fluid supply) and each appropriate charge ring 86, as discussed above. As shown in FIGS. 1 and 2, these potential differences are created by grounding plate 18 and applying appropriately timed voltage pulses to wires 92 in connectors 94 (only one of which is illustrated). Connectors 94 are plugged into receptacles 96 at the edge of charge ring plate 50 and deliver appropriate voltage pulses over printed circuit lines 98 to charge rings 86. Charge ring plate 50 is fabricated from insulative material and charge rings 86 are formed by coating the surfaces of orifices in the charge ring plate with a conductive material.

Figure 5:
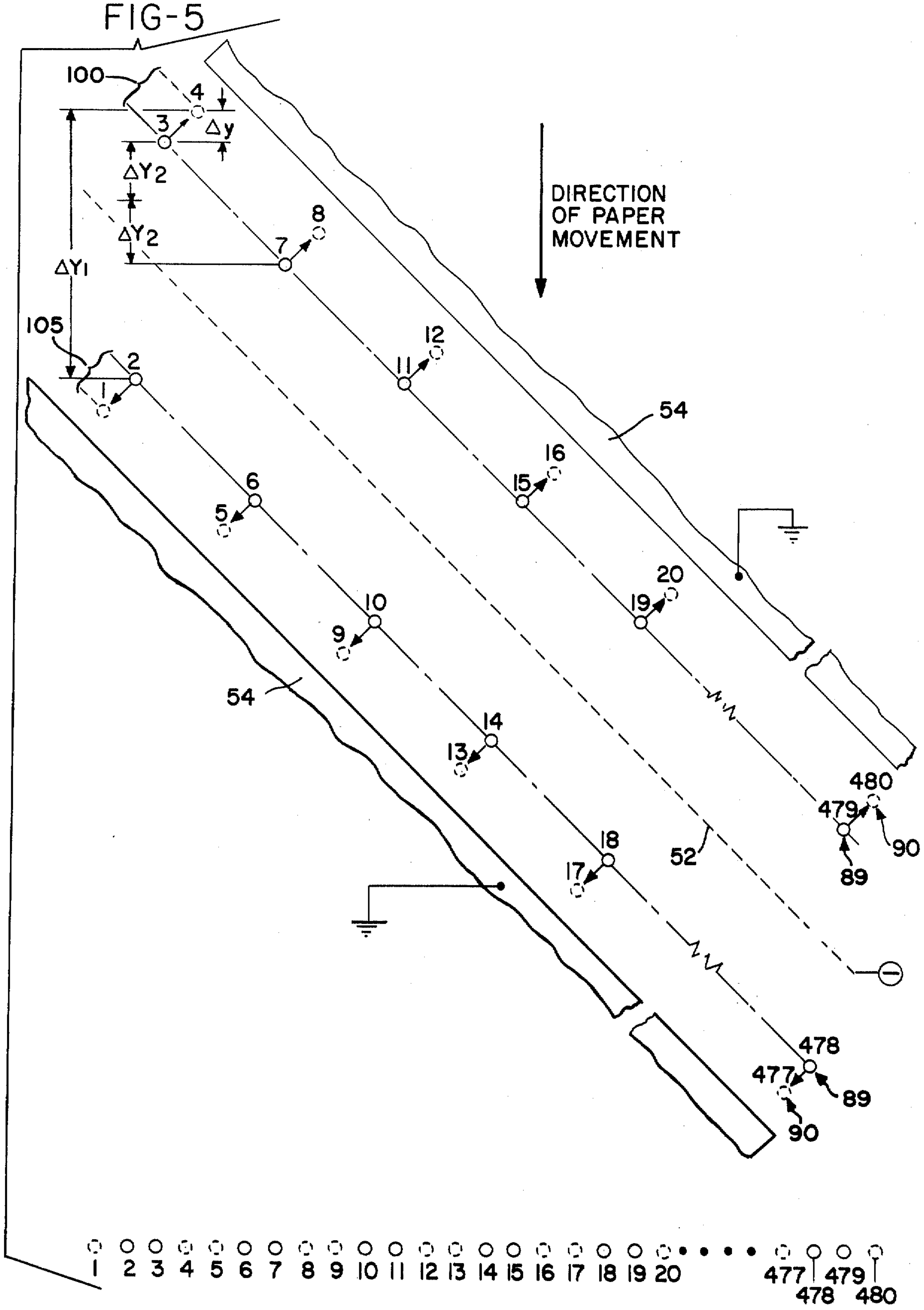
FIG. 5 is a simplified diagrammatic view taken generally along line 5—5 in FIG. 4.

Referring now to FIG. 5, a diagrammatic representation of the ink jet pattern taken generally along line 5—5 in FIG. 4 shows two print positions associated with each drop stream and two print position groups 100 and 105. Catchers 54 are outwardly disposed from the rows of drop streams. Means for grounding the catchers are provided such that they function as deflection electrodes in conjunction with deflection ribbon 52. A deflecting voltage of the same polarity as the charge selectively applied to the drops is applied to the ribbon 52. The slightly charged drops are thus deflected outward from the undeflected print positions shown by the solid circles to the print positions shown by the dashed circles. If a greater charge is selectively applied to the ink drops, the drops will be deflected to catchers 54 and will therefore not print on the moving web.

As illustrated in FIG. 5 the rows of drops are positioned obliquely to the direction of web movement. This oblique positioning of the print bar results in a greater drop density across the width of the web and allows for better resolution transverse to the direction of web movement. Additionally by providing for two print positions for each orifice, the resolution is increased two-fold from what it would otherwise be. The print positions are numbered 1–480. It is assumed for the purposes of illustration that 240 orifices are used with each of the two parallel rows having 120 such orifices.

As described previously, the print information is supplied to the charge rings in a digital manner. Each charge ring is supplied with a voltage which either will cause a drop to be deposited at one of its two associated print positions or will cause the drop to be deflected to a catcher. In actuality, several drops for each print position will be generated during the time that one line of print information is available for control of the recording head.

The timing of the application of print information to the charge rings is necessarily related to the geometry of the print positions and to the speed of web movement. As shown in FIG. 5, $\Delta Y$ is the longitudinal distance between the charged print position of an orifice and its associated non-charged print position. The web travels this distance $\Delta Y$ in a time $\Delta t$, which time is illustrated in the timing diagram of FIG. 8.

Figure 8:
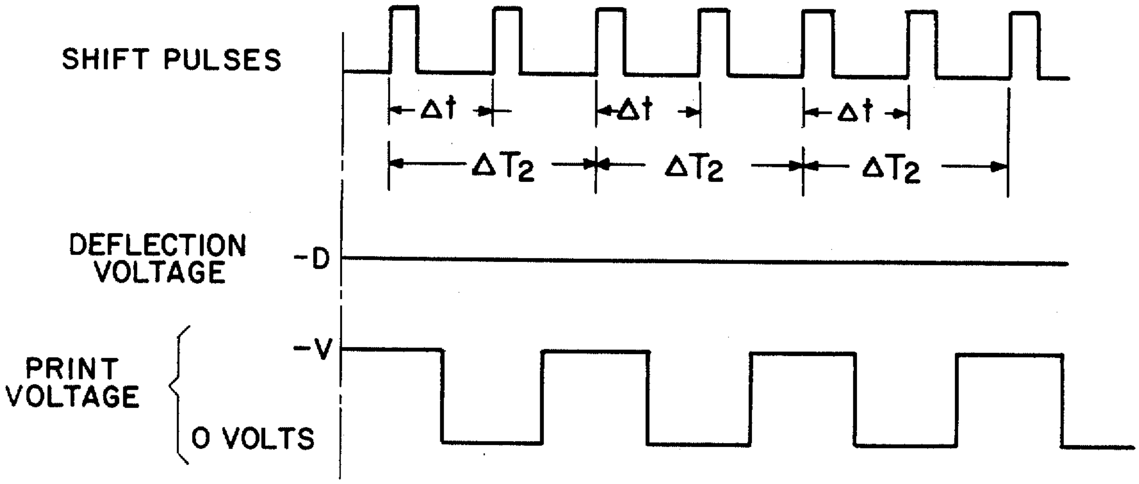
FIG. 8 is a timing diagram useful in explaining the operation of the present invention.

Also illustrated in FIG. 5 are distances $\Delta Y_1$ and $\Delta Y_2$ which are distances corresponding to times $\Delta T_1$ and $\Delta T_2$, respectively. $\Delta T_1$ is the time delay which must be introduced into the print information for the second row of drops such that the drops printed by the two rows will be in registration. $\Delta T_2$ is shown in FIG. 8 as being the time required for the web to move the distance between successive transitions in print information. For the sake of simplicity the distance $\Delta Y_2$ is shown to be one-half the widthwise distance between orifices. This, of course, could be varied if desired. It should be understood that all timing pulses are synchronized with tachometer pulses providing an indication of the speed of web movement. Thus the printing operation will automatically compensate for fluctuations in web speed.

The print information may be derived in a number of ways. An optical scanner, having as many scanning positions as there are print positions in the recording head, could be arranged to scan a copy of the material to be printed in synchronism with the movement of the print web. If the geometry of the scanning positions on the scanner were identical with the print positions of the printer, the data signals supplied by the scanner would be properly timed. Each orifice would alternately receive print information from the scanners associated with its two print positions. For a continuous printing operation, the image to be printed could be repetitively scanned in synchronism with the movement of the web. Alternatively, the properly timed scan information could be stored on magnetic tape or stored in computer memory and repetitively retrieved as needed.

The print information needed to control each individual drop stream may also be generated with a computer data processing arrangement, as shown in U.S. Pat. No. 3,913,719, issued Oct. 21, 1975 to Frey, and assigned to the assignee of the present invention. In the Frey device, images are computer generated on a line-by-line basis before being supplied to the jet printer. Thereafter appropriate delays are provided in some data paths to create the desired registration between the two rows of drop streams.

Figure 6:
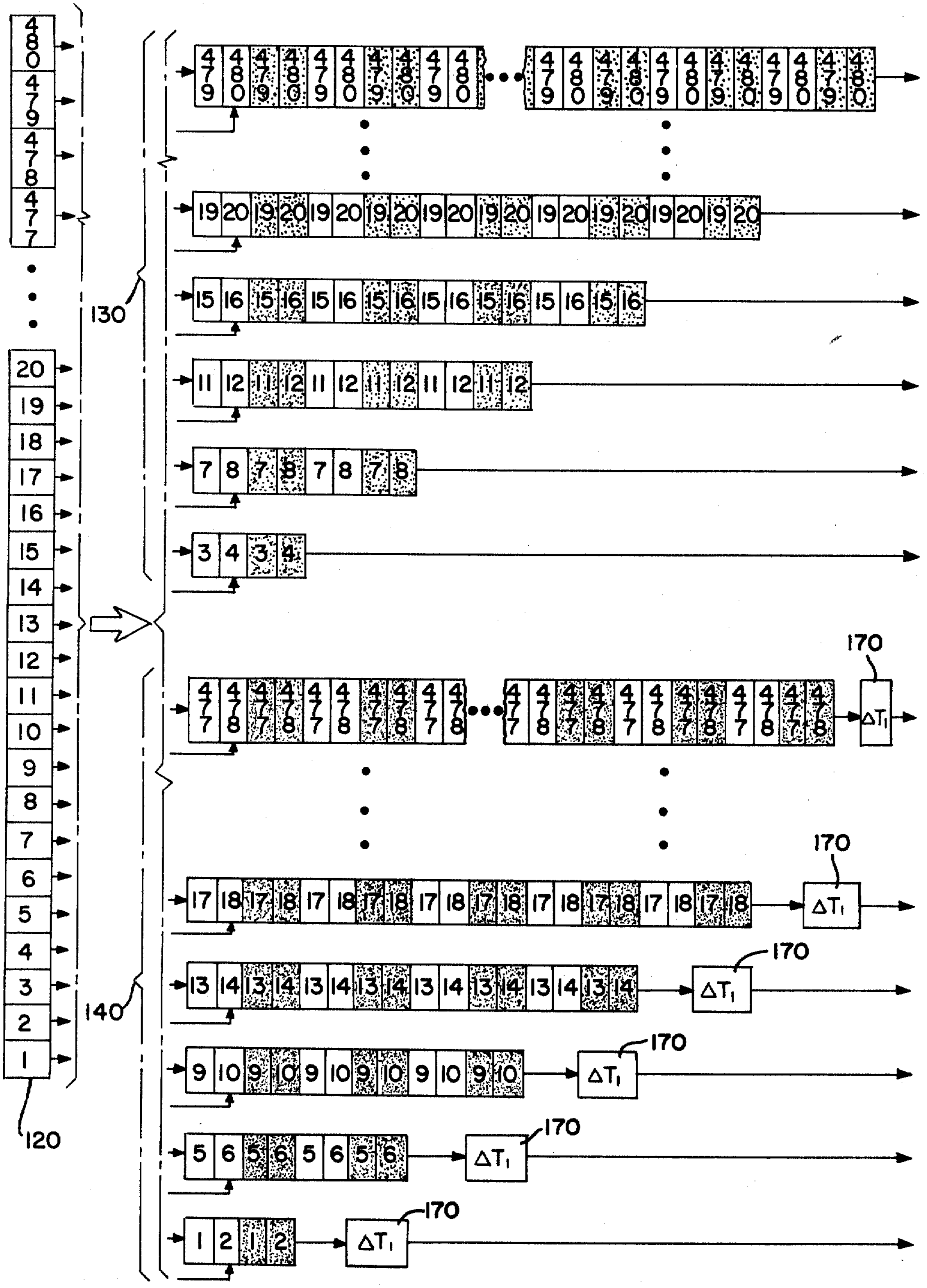
FIG. 6 is a portion of data handling apparatus which may be used with the present invention.
Figure 7:
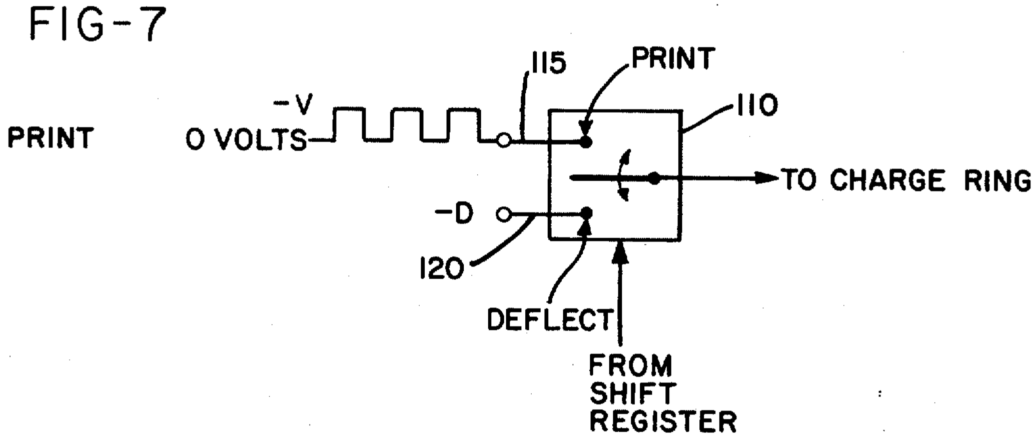
FIG. 7 is a diagrammatic representation of a switching arrangement for a charge ring.

If the successive lines of print information are computer assembled in a manner such as shown by Frey, data transformation as shown in FIGS. 6–8 may be used to appropriately time the print signals. The charge ring for each orifice has associated with it an individual switch such as shown in FIG. 7. The charge ring alternately services its two associated print positions. If the print position is to receive an ink drop, the output of switch 110 will be connected to input 115. Depending on whether the orifice is at that moment servicing the undeflected, non-charged print position or the deflected, charged print position, the drop then generated will be uncharged or slightly charged by the application of a ground potential or a $-V$ potential, respectively, to the charge ring. If, however, the drop is to be deflected such that it does not land on the web but will strike a catcher, the switch 110 will be switched such that its output is connected to input 120, to which is applied a d.c. potential of $-D$ volts. The print signal applied to input 115 and the catch signal applied to input 120 are shown in FIG. 8.

As seen in FIG. 6, a line of print data is computer assembled and supplied to register 120. A plurality of shift registers 130 of varying length are provided to supply data to the row of charge rings serving print positions in group 100 (FIG. 5). Each shift register stage is labeled with the print position number of the data bit stored therein. A binary 1 or 0 is stored in each stage to indicate whether a drop is to be printed or deflected at the associated print position. Similarly, a second group of shift registers 140 is provided to service the print positions in group 105.

The print information from register 120 is provided in parallel to the first two stages of shift registers 130 and 140. This information will then be serially shifted along each of the shift registers until it is outputted to the associated charge ring switch at the proper time.

As shown in FIG. 5, if a solid widthwise line of drops is to be printed, the first print position to receive a drop will be position 4. The first print position in group 105 to receive a drop will be position 2. The time differential between these two print positions in relation to the speed of web movement is $\Delta T_1$. Therefore, it is apparent that the outputs of shift registers 140 must be delayed by a time $\Delta T_1$ to be properly timed with respect to the outputs of the registers 130. Delays 170 are therefore provided at the outputs of shift registers 140.

As can be seen from FIG. 5, the time delay for information between adjacent print positions printed by the same orifice is $\Delta t$. For this reason, the print information relating to adjacent print positions is loaded into adjacent register stages and serially shifted through registers 130 and 140 by shift pulses which are $\Delta t$ apart. The timing of the shift pulses is illustrated in FIG. 8.

Since, as discussed above, successive lines of print information will be spaced $\Delta Y_2$ apart, at any given instant each orifice servicing print positions in groups 100 and 105 will be providing a drop for a print line which is two lines removed from the lines being printed by the adjacent orifices in the same row. Since two register stages in each of registers 130 and 140 are used to store the print information for a single print line, it is clear that the shift registers 130 and 140 must successively increase in length by four stages. Since the timing delay between adjacent print lines is $\Delta T_2$, the pairs of shift pulses for each line are timed as shown in FIG. 8.

It should be recognized that other timing arrangements may be used to provide appropriately timed print information. The device herein illustrated utilizes the same alternating print signal for the charge ring switches controlling both rows of drop streams. Clearly, a separate print signal could be used for each row provided the frequencies of the signals were coordinated with the geometry of the orifices. The printing arrangement illustrated herein uses a print bar disposed substantially at a 45° angle to the direction of web movement. This angle could be increased or decreased depending upon the desired horizontal resolution. It should be understood, however, that the timing arrangement would have to be modified to insure proper registration.

Further, it will be realized that the embodiment shown herein is arranged such that successive bits of print information directed to an orifice charge ring may relate to the same print line. In other words, referring to FIG. 5, the orifice associated with print positions 3 and 4 will print position 4 and will thereafter print position 3 at a time $\Delta t$ seconds later, with no intervening print operations. It should be realized that the individual orifices could alternately service their respective charged and uncharged print positions at a much higher rate if the proper data handling configuration were provided.

While the method herein described, and the form of apparatus for carrying this method into effect, constitute preferred embodiments of the invention, it is to be understood that the invention is not limited to this precise method and form of apparatus, and that changes may be made in either without departing from the scope of the invention.

What is claimed is:

1. An ink jet printer for printing on a moving web upon which are defined a plurality of print positions across the width of the web, adjacent print positions being laterally displaced from each other by a minimal distance such that printing may be accomplished without interruption across the web, comprising:

means for generating a row of drop streams, said row being in a line which is oblique to the direction of web movement, means for selectively charging each drop in said drop streams to one of a plurality of charge levels, a catcher extending parallel to said row, and means for generating a drop deflecting field substantially perpendicular to said row and of appropriate magnitude that the drops in each of said drop streams may be directed to strike the web at one of a plurality of print positions or may be sufficiently deflected to strike said catcher, each drop stream servicing a plurality of adjacent print positions across the width of the web.

2. Apparatus according to claim 1 wherein said drop deflecting field is static.

3. Apparatus according to claim 2 further comprising means for generating a second such row of drop streams in a line oblique to the direction of web movement, means for selectively charging each drop in said second row to one of a plurality of charge levels, a second catcher extending parallel to said second row, means for generating a drop deflecting field substantially perpendicular to said second row and of appropriate magnitude that each of the drop streams in said second row may strike the web at one of a plurality of print positions or may be sufficiently deflected to strike said second catcher, each drop stream servicing adjacent positions across the width of the web, the plurality of print positions serviced by drop streams in said second row being interlaced with the plurality of print positions serviced by drop streams in said first row, and time delay means for delaying the timing of charge application to the drops in one of said rows relative to that in the other of said rows.

4. Apparatus according to claim 3 wherein said rows are oriented 45° relative to said direction of web movement.

5. In an ink jet printer for printing on a moving web including means for generating first and second parallel rows of drop streams, means for selectively charging drops in said drop streams, a pair of opposed catchers disposed outwardly of said rows of drop streams and parallel thereto, means for grounding said catchers and causing them to function as deflection electrodes, a deflection ribbon extending between said rows of drop streams in parallel relation thereto, and means for applying to said ribbon a deflection voltage of the same polarity as the polarity of the charge selectively applied to said drops, such that the deflection of said drops is perpendicular to said rows, the improvement comprising:

means for positioning said rows of drops such that said rows are oblique to the direction of web movement, and in which said means for selectively charging includes means for selectively charging each drop to one of at least two levels of charge whereby two print positions on the moving web are serviced by each drop stream and the print positions serviced by the drop streams in said first row of drop streams are interlaced with and adjacent to the print positions serviced by the drop streams in said second row of drop streams to provide for uninterrupted printing across the width of the web.

6. The device of claim 5 in which one of said print positions serviced by each drop stream is defined by the trajectory of an uncharged drop which is not deflected.

7. The printer of claim 5 in which said drop streams in said two parallel rows are generally symmetrically positioned with respect to said deflection ribbon with each of said rows extending substantially along the complete length of said deflection ribbon.

8. The method of printing on a moving web comprising providing a first plurality of ink jet streams, said streams formed in a line oblique to the direction of movement of a web therebeneath, selectively deflecting each of said ink jet streams in a direction substantially perpendicular to said line formed by said streams such that each of said streams impinges upon said web at selected ones of a plurality of print positions, said print positions being adjacent and thereby extending across the width of said web, and selectively deflecting each of said streams to a catch position such that said streams do not impinge upon said web when printing is not desired.

9. The method of printing of claim 7 further comprising providing a second plurality of ink jet streams, said streams formed in a second line oblique to the direction of movement of the web therebeneath and longitudinally displaced from said first plurality of ink jet streams by a predetermined distance, and selectively deflecting each of said ink jet streams in said second plurality in a direction substantially perpendicular to said second line formed by said streams such that each of said streams impinges upon said web at selected ones of a plurality of print positions, the print positions serviced by said first plurality of ink jet streams being interlaced with the print positions serviced by said second plurality of ink jet streams such that drops in said jet streams may be deposited at adjacent print positions across the web width, and selectively deflecting each of said streams in said second plurality to a catch position such that said streams do not impinge upon said web when printing is not desired.

10. The method of printing of claim 9 further comprising timing the selective deflection of said first plurality of ink jet streams to said print and catch positions and the selective deflection of said second plurality of ink jet streams to said print and catch positions such that there is registration and interlaced of images printed by said first plurality of ink jet streams with images printed by said second plurality of ink jet streams.

11. The method of claim 8 in which the step of providing a first plurality of ink jet streams includes the step of positioning said streams in a line which is substantially 45 degrees to the direction of web movement, and in which the step of selectively deflecting each of said ink jet streams in a direction perpendicular to said line formed by said streams such that said streams impinge upon said web at selected ones of a plurality of print positions includes the step of not deflecting said streams such that said streams impinge on said web at a portion of said plurality of print positions.

12. The method of printing of claim 8 said steps of selectively deflecting include the steps of selectively charging drops in said ink jet streams to one of a plurality of charge levels, and providing a static electric field through which said streams must pass to reach said web, said field substantially perpendicular to said line formed by said streams.

* * * * *

UNITED STATES PATENT AND TRADEMARK OFFICE

CERTIFICATE OF CORRECTION

PATENT NO. : 4,085,409

DATED : April 18, 1978

INVENTOR(S) : Suresh C. Paranjpe

It is certified that error appears in the above-identified patent and that said Letters Patent are hereby corrected as shown below:

Column 10, line 14--"The method of printing of claim 7" should read-- The method of printing of claim 8--.

Column 10, line 42--"interlaced" should be-- interlace--.

Signed and Sealed this

*Fifth* Day of *September 1978*

[SEAL]

*Attest:*

RUTH C. MASON
*Attesting Officer*

DONALD W. BANNER
*Commissioner of Patents and Trademarks*